United States Patent
Every et al.

(10) Patent No.: US 9,944,127 B2
(45) Date of Patent: Apr. 17, 2018

(54) SYSTEM AND METHOD FOR SYNTHESIZING AN ENGINE SOUND

(71) Applicants: BlackBerry Limited, Waterloo (CA); 2236008 Ontario Inc., Waterloo (CA)

(72) Inventors: Mark Robert Every, Vancouver (CA); Phillip Alan Hetherington, Vancouver (CA); Leonard Charles Layton, Vancouver (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 15/235,515

(22) Filed: Aug. 12, 2016

(65) Prior Publication Data

US 2018/0043826 A1    Feb. 15, 2018

(51) Int. Cl.
| | |
|---|---|
| *H04B 1/00* | (2006.01) |
| *B60C 9/00* | (2006.01) |
| *H04R 3/04* | (2006.01) |
| *H03G 3/00* | (2006.01) |

(52) U.S. Cl.
CPC .................. *B60C 9/00* (2013.01); *H04R 3/04* (2013.01); *H04R 2430/01* (2013.01); *H04R 2499/13* (2013.01)

(58) Field of Classification Search
CPC ............... G10K 15/02; G10K 15/04; G10K 2210/1282; G10K 2210/3045; G10K 11/1784; G10K 2210/12822; G10K 2210/3011; G10K 2210/3032; G10K 11/1786; G10K 2210/121; G10K 2210/128; G10K 2210/30232; G10K 2210/3046; H04R 5/04; H04R 2430/01; H04R 2499/13; H04R 3/12; H03G 3/32; H03G 5/165

USPC ...... 381/86, 61, 74.4, 71.11, 102, 103, 73.1, 381/98; 181/213

See application file for complete search history.

(56) References Cited

U.S. PATENT DOCUMENTS

| | | | | |
|---|---|---|---|---|
| 2008/0192954 | A1* | 8/2008 | Honji ..................... | G10K 15/04 381/86 |
| 2009/0052682 | A1* | 2/2009 | Kuroiwa ................ | G10K 15/02 381/63 |
| 2009/0080672 | A1* | 3/2009 | Smith .................... | B60Q 5/008 381/86 |
| 2013/0214921 | A1* | 8/2013 | Meschke ................ | G10K 15/02 340/467 |

FOREIGN PATENT DOCUMENTS

| | | |
|---|---|---|
| DE | 102011112181 A1 | 4/2012 |
| DE | 102013011144 A1 | 1/2015 |

OTHER PUBLICATIONS

European Search Report corresponding to EP Application No. 17185412.8 dated Jan. 30, 2018, 8 pages.

(Continued)

*Primary Examiner* — Norman Yu
(74) *Attorney, Agent, or Firm* — Brinks Gilson & Lione

(57) ABSTRACT

A system and method for synthesizing an engine sound may receive one or more vehicle operational data signals. One or more tone parameters associated with a Shepard tone generator may be modified responsive to the one or more vehicle operation data signals. A Shepard tone may be generated responsive to the modified one or more tone parameters. The Shepard tone may be reproduced using one or more audio transducers.

20 Claims, 3 Drawing Sheets

(56) References Cited

OTHER PUBLICATIONS

Anonymous: "'The Dark Knight' sound effects—latimes," Feb. 4, 2009, Retrieved from the Internet: URL:http//articles.latimes.com/2009/feb/04/news/en-lightsnknight4, 2 pages.

* cited by examiner

SYSTEM AND METHOD FOR SYNTHESIZING AN ENGINE SOUND

BACKGROUND

1. Technical Field

The present disclosure relates to the field of processing audio signals. In particular, to a system and method for synthesizing an engine sound.

2. Related Art

Engine Sound Enhancement (ESE) may be utilized in an automotive vehicle to either create new or enhance an existing engine sound. ESE may be excited or driven by a tachometer signal to drive one or more sinusoidal signals relating to a rotation per minute (RPM) value (b.g. engine speed). In an electric car, ESE may be used to create a sound that is responsive to the RPM of the electric motor, providing a more familiar engine sound that relates to a gasoline engine as it steps through its gear ratios. There may be occasions when the output of an electric motor is not stepped through gears, for example, when the electric motor is tied directly to a wheel. The RPM may then be continuous from 0 to a very high number. An engine sound that is directly connected to a very high RPM may wear on the driver if sustained at a high speed. In contrast, if geared down, a synthetically created engine sound may sound pleasing, even if sustained.

There is a need for an engine sound enhancement systems that provides feedback responsive to vehicle conditions and motor types.

BRIEF DESCRIPTION OF DRAWINGS

The system and method may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for synthesizing an engine sound may receive one or more vehicle operational data signals. One or more tone parameters associated with a Shepard tone generator may be modified responsive to the one or more vehicle operation data signals. A Shepard tone may be generated responsive to the modified one or more tone parameters. The Shepard tone may be reproduced using one or more audio transducers.

A Shepard's tone is a known auditory illusion that is perceived as an infinitely increasing or decreasing tone, even though the actual pitch may be maintained within a comfortable range throughout the continuous playback. The Shepard's tone may be utilized to create an engine sound that is not stepped up or down with gears, varies continuously with the engine, and yet maintains a comfortable pitch range for a driver. The Shepard's tone may be responsive to a continuously changing RPM from an electric motor to create an acceptable pitch range for an engine sound inside or outside the vehicle. The created sound may provide the illusion of automatically "change gears" without the change being conscious to a listener. Playback may increase, decrease, or hold pitch, depending on the RPM and/or other vehicle operational data signals. The mechanism may be perceptually pleasing when utilized with a continuously variable, gearless, or electric motor. Other known auditory illusions including, for example, a Risset Rhythm, may be utilized instead of a Shepard's tone for a similar effect. Embodiments described herein as using a Shepard's tone may be understood to include using a modified Shepard's tone.

Additional vehicle parameters, or vehicle operational data signals, may be utilized to modify the parameters of the Shepard's tone. Vehicle parameters such as throttle position, engine load, acceleration and vehicle speed may also be used as inputs to a Shepard's tone engine synthesizer. One or more vehicle parameters may be readily available in real-time on a vehicle bus such as Controller Area Network (CAN bus), or derived from external sensors such as, for example, accelerometers. In one example, the pitch of the Shepard's tone may increase with increasing vehicle speed, and decrease with decreasing vehicle speed. The level, loudness, equalization (EQ) or other qualities of the Shepard's tone may also be changed dynamically dependent on these vehicle parameters. In another example, once a vehicle reaches a cruising speed, the volume of the Shepard's tone may decrease gradually.

Figure 1:
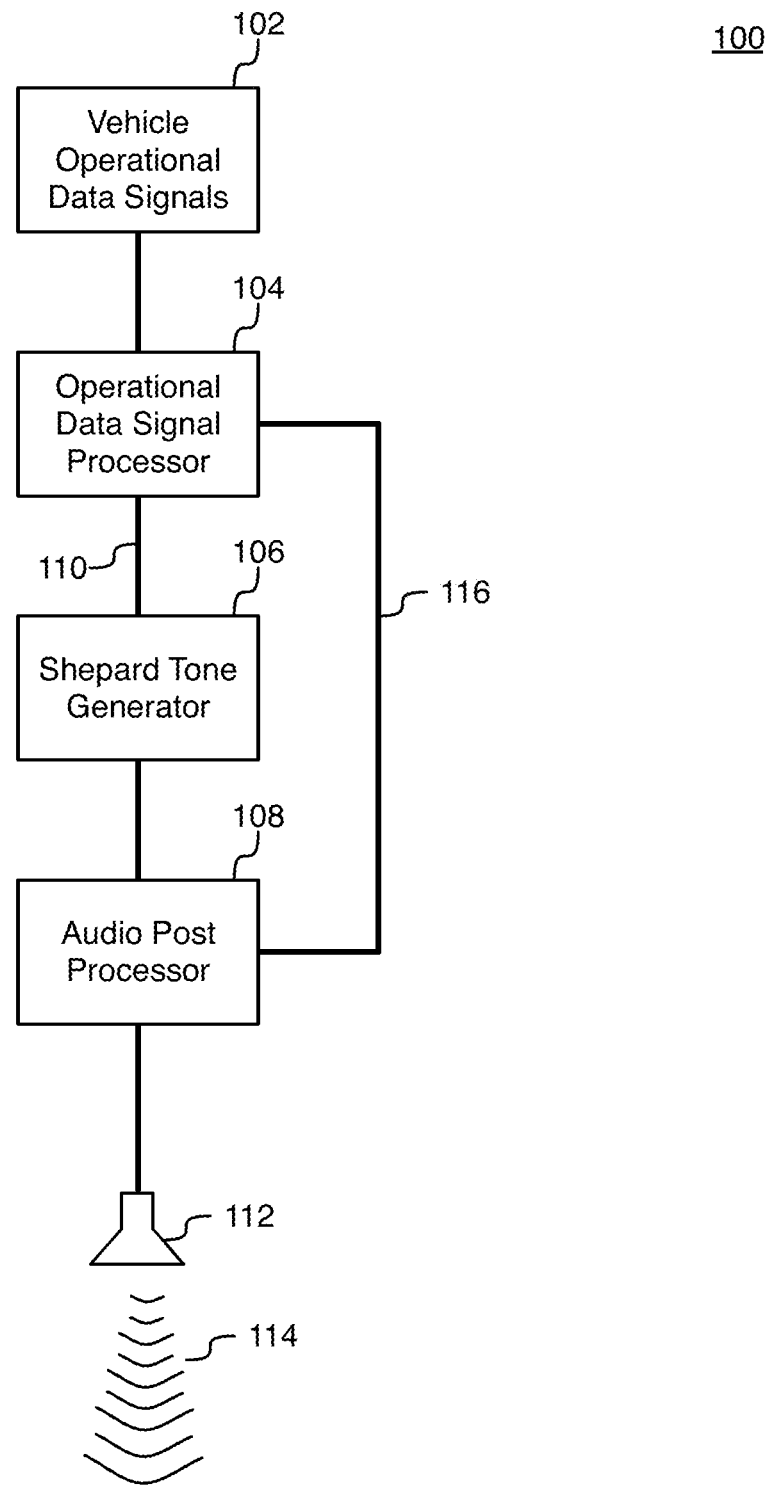
FIG. 1 is a schematic representation of a system for synthesizing an engine sound.

FIG. 1 is a schematic representation of a system for synthesizing an engine sound. The system 100 is an example system for synthesizing an engine sound. The example system configuration includes receiving one or more vehicle operational data signals 102, an operational data signal processor 104, a Shepard tone generator 106, an audio post processor 108 and one or more audio transducers 112. The one or more vehicle operational data signals 102 may include, for example, any one or more of motor rotational speed (e.g. RPM), vehicle acceleration, vehicle velocity, motor load, throttle position, gearbox (e.g. transmission) gear selection and engine power settings. One or more vehicle operational data signals 102 may be readily available in real-time on a vehicle bus including a Controller Area Network (CAN bus) and/or a MOST (Media Oriented Systems Transport) bus, or derived from one or more external sensors such as, for example, accelerometers and tachometers.

The operational data signal processor 104 may utilize the one or more vehicle operational data signals 102 to modify one or more tone parameters 110 associated with the Shepard tone generator 106 responsive to the one or more vehicle operational data signals 102. Modify the one or more tone parameters 110 associated with the Shepard tone generator 106 responsive to the one or more vehicle operational data signals 102 may include setting an initial and/or default value for any of the one or more tone parameters 110. Alternatively or in addition, another mechanism may be used to set an initial and/or default value for any of the one or more tone parameters 110.

The generated Shepard's tone may be perceived by a listener to simulate rising and falling sounds of an engine under varying operating conditions. in one example, the tone parameter 110 associated with pitch of the Shepard tone generator 106 may be modified to increase the pitch of the Shepard's tone responsive to the vehicle operation data signal 102 associated with increasing vehicle velocity. The one or more tone parameters 110 of the Shepard tone generator 106 comprise any one or more of the rate of pitch change, the direction of pitch change, the number of concurrent tones, volume, loudness, equalization parameters and distortion parameters. In a another example, the tone parameter 110 associated with pitch of the Shepard tone generator 106 may be modified to decrease the pitch of the Shepard's tone responsive to the vehicle operation data signal 102 associated with decreasing vehicle velocity. In a further example, the tone parameter 110 associated with pitch of the Shepard tone generator 106 may be modified to increase the number of concurrent tones of the Shepard's tone responsive to the vehicle operation data signal 102 associated with increasing vehicle acceleration. In another example, the timbre of the Shepard's tone comprising the harmonic components related to the fundamental frequency may be modified, or modulated, responsive to the vehicle operation data signal 102. The Shepard's tone may be synthesized through additive and/or granular synthesis where the parameters of the additive and/or granular synthesis may be modified to change the timbre responsive to the vehicle operation data signal 102.

The operational data signal processor 104 may modify one or more audio post processing parameters 116 associated with the audio post processor 108 responsive to the one or more vehicle operational data signals 102. The audio post processor 108 may, for example, comprise any one or more of the equalization, dynamics processing, reverberation and limiting. The operation data signal processor 104 may, for example, modify the audio post processing parameter 116 associated with wet/dry amount of the reverberation to contain less reverberation when the vehicle is accelerating.

The operational data signal processor 104 may modify one or more tone parameters 110 such that the volume of the Shepard tone decreases over time when vehicle velocity is substantially constant. The vehicle operator may prefer to perceive a lower engine sound if there are no changes to current engine conditions. One or more of the vehicle data signals may be filtered utilizing one or more time constants to adjust the perceived responsiveness of the Shepard tone generator 106 and/or the audio post processor 108 to changing vehicle conditions.

The output of the Shepard tone generator 106 and/or the audio post processing 108 may be reproduced in the one or more audio transducers 112. The one or more audio transducers 112 may be located in any one or more locations including inside a vehicle and outside the vehicle. The audio transducers 112 and/or the audio post processing 108 may be concurrently utilized to reproduce audio signals for other sources including, for example, an infotainment system, an active noise cancellation system and a proximity warning system.

Figure 2:
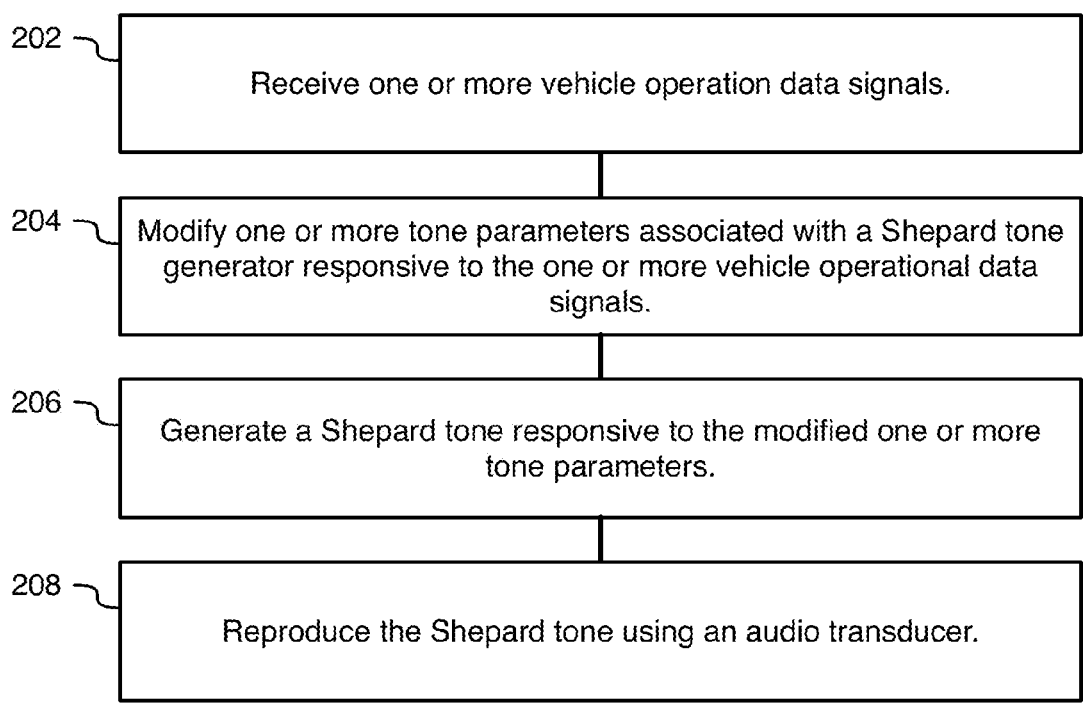
FIG. 2 is a representation of a method for synthesizing an engine sound.

FIG. 2 is a representation of a method for synthesizing an engine sound. The method 200 may be, for example, implemented using the system 100 and described herein with reference to FIG. 1. The method 200 may include the following acts. Receiving one or more vehicle operational data signals 202. Modifying one or more tone parameters associated with a Shepard tone generator responsive to the one or more vehicle operation data signals 204. Generating a Shepard tone responsive to the modified one or more tone parameters 206. Reproducing a Shepard tone using an audio transducer 208. Other embodiments of a method for synthesizing an engine sound may include more or less acts than those described above with reference to FIG. 2.

Figure 3:
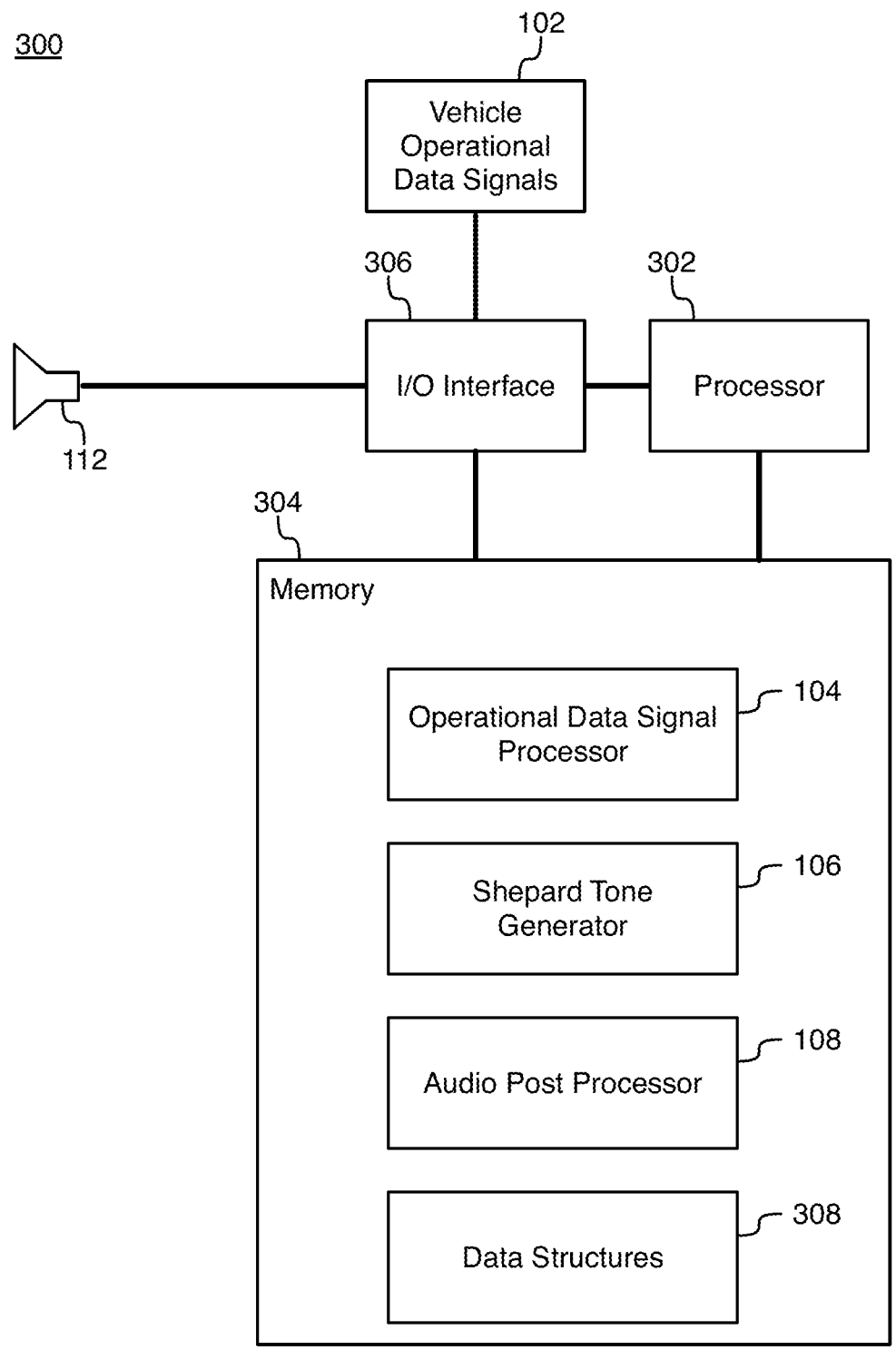
FIG. 3 is a further schematic representation of a system for synthesizing an engine sound.

FIG. 3 is a further schematic representation of a system for synthesizing an engine sound. The system 300 comprises a processor 302, memory 304 (the contents of which are accessible by the processor 302) and an input/output (I/O) interface 306. The memory 304 may store instructions which when executed using the process 302 may cause the system 300 to render the functionality associated with synthesizing an engine sound as described herein. For example, the memory 304 may store instructions which when executed using the processor 302 may cause the system 300 to render the functionality associated with the operational data signal processor 104 and the Shepard tone generator 106 as described herein. In addition, data structures, temporary variables and other information may be stored in data storage 308.

The processor 302 may comprise a single processor or multiple processors that may be disposed on a single chip, on multiple devices or distributed over more that one system. The processor 302 may be hardware that executes computer executable instructions or computer code embodied in the memory 304 or in other memory to perform one or more features of the system. The processor 302 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 304 may comprise a device for storing and retrieving data, processor executable instructions, or any combination thereof. The memory 304 may include non-volatile and/or volatile memory, such as a random access memory (RAM), a read-only memory (ROM), an erasable programmable read-only memory (EPROM), or a flash memory. The memory 304 may comprise a single device or multiple devices that may be disposed on one or more dedicated memory devices or on a processor or other similar device. Alternatively or in addition, the memory 304 may include an optical, magnetic (hard-drive) or any other form of data storage device.

The memory 304 may store computer code, such as the operational data signal processor 104 and the Shepard tone generator 106 as described herein. The computer code may include instructions executable with the processor 302. The computer code may be written in any computer language, such as C, C++, assembly language, channel program code, and/or any combination of computer languages. The memory 304 may store information in data structures including, for example, information representative one or more tone parameters of the Shepard tone generator.

The I/O interface 306 may be used to connect devices such as, for example, the audio transducer 112, the vehicle operational data signals 102 and to other components of the system 300.

All of the disclosure, regardless of the particular implementation described, is exemplary in nature, rather than limiting. The system 300 may include more, fewer, or different components than illustrated in FIG. 3. Furthermore, each one of the components of system 300 may include more, fewer, or different elements than is illustrated in FIG. 3. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method of this specification have been described herein with reference to synthesizing an engine sound, those of ordinary skill in the art will understand that the inventive system and method are not limited to generating engine sounds but may be used to generate sounds that provide the simulate or provide the illusion of operation of various types of mechanical systems and mechanisms.

While various embodiments of the system and method for synthesizing an engine sound, it will be apparent to those of ordinary skill in the art that many more embodiments and implementations are possible within the scope of the present invention. Accordingly, the invention is not to be restricted except in light of the attached claims and their equivalents.

The invention claimed is:

1. A method for synthesizing an engine sound comprising:
   receiving one or more vehicle operational data signals associated with a vehicle;
   modifying one or more tone parameters associated with a Shepard tone generator through a signal processor responsive to the one or more vehicle operational data signals;
   generating a Shepard tone responsive to the signal processor that renders the modified one or more tone parameters;
   generating an audio post processing feedback parameter by post processing the Shepard tones;
   reproducing the Shepard tone using one or more audio transducers;
   where the modification of the one or more tone parameters occurs when the vehicle's velocity is substantially constant resulting in a low volume level of the reproduced Shepard tone;
   where the signal processor modifies the audio post processing feedback parameter when a vehicle operating condition is detected.

2. The method for synthesizing an engine sound of claim 1, where the one or more vehicle operational data signals comprises one or more of a motor rotational speed, the vehicle's acceleration, the vehicle's velocity, a motor load, a throttle position and a plurality of power settings.

3. The method for synthesizing an engine sound of claim 1, where the one or more tone parameters of the Shepard tone generator comprise one or more of a rate of pitch change, a direction of pitch change, a plurality of concurrent tones, a volume level, a loudness level, a plurality of equalization parameters and a plurality of distortion parameters.

4. The method for synthesizing an engine sound of claim 1, where the one or more audio transducers are located outside of the vehicle.

5. The method for synthesizing an engine sound of claim 1, where the volume level of the reproduced Shepard tone decreases over time when the vehicle's velocity is substantially constant.

6. The method for synthesizing an engine sound of claim 1, where the one or more vehicle operational data signals are filtered utilizing a time constant.

7. The method for synthesizing an engine sound of claim 1, where the act of generating the Shepard's tone simulates rising and failing sounds of an engine under varying operating conditions.

8. A system for synthesizing an engine sound comprising:
   a receiver configured to receive one or more vehicle operational data signals associated with a vehicle;
   a signal processor configured to modify one or more tone parameters responsive to the one or more vehicle operational data signals;
   a Shepard tone generator configured to generate a Shepard tone responsive to the modified one or more tone parameters;
   an audio post processor configured to render an audio post-processing parameter in response to the audio post processor's processing of the Shepard tone; and
   a reproducer configured to reproduce the Shepard tone using one or more audio transducers;
   where the one or more tone parameters are associated with the Shepard tone generator;
   where the signal processor is further configured to modify the audio post-processing parameter when a vehicle operating condition is detected; and
   where the modification of the one or more tone parameters occurs in response to the vehicle reaching a substantially constant velocity resulting in a lowering of the volume level of the reproduced Shepard tone.

9. The system for synthesizing an engine sound of claim 8, where the one or more vehicle operational data signals comprises one or more of a motor rotational speed, a vehicle acceleration, a vehicle velocity, a motor load, a throttle position and a plurality of power settings.

10. The system for synthesizing an engine sound of claim 8, where the one or more tone parameters of the Shepard tone generator comprise one or more of a rate of pitch change, a direction of pitch change, a plurality of concurrent tones, a volume level, a loudness level, a plurality of equalization parameters and a plurality of distortion parameters.

11. The system for synthesizing an engine sound of claim 8, where the one or more audio transducers may be located inside a vehicle.

12. The system for synthesizing an engine sound of claim 8, where a volume level of the Shepard tone decreases over time when a vehicle velocity is substantially constant.

13. The system for synthesizing an engine sound of claim 8, where the one or more vehicle data signals are filtered.

14. The system for synthesizing an engine sound of claim 8, where the generated Shepard's tone simulates rising and failing sounds of an engine under varying operating conditions.

15. The system for synthesizing an engine sound of claim 8, where the vehicle operating condition comprises an acceleration and the audio post processing parameter comprises a wet reverberation.

16. A non-transitory machine-readable medium encoded with machine-executable instructions, where execution of the machine-executable instructions is for:
receiving one or more vehicle operational data signals;
modifying one or more tone parameters associated with a Shepard tone generator through a signal processor responsive to the one or more vehicle operational data signals;
generating a Shepard tone responsive to the signal processor that renders the modified one or more tone parameters;
generating an audio post processing feedback parameter by post processing the Shepard tones; and
reproducing the Shepard tone using one or more audio transducers;
where the signal processor modifies the audio post processing feedback parameter when a vehicle operating condition is detected; and
where the modification of the one or more tone parameters occurs when the vehicle's velocity is substantially constant resulting in a low volume level of the reproduced Shepard tone.

17. The non-transitory machine-readable medium of claim 16, where the one or more vehicle operational data signals comprises one or more of a motor rotational speed, the vehicle's acceleration, the vehicle's velocity, a motor load, a throttle position and power settings.

18. The non-transitory machine-readable medium of claim 16, where the one or more tone parameters of the Shepard tone generator comprise one or more of a rate of pitch change, a direction of pitch change, a plurality of concurrent tones, a volume level, a loudness level, a plurality of equalization parameters and a plurality of distortion parameters.

19. The method for synthesizing an engine sound of claim 16, where a volume level of the Shepard tone decreases over time when a vehicle's velocity is substantially constant.

20. A vehicle comprising:
a receiver configured to receive one or more vehicle operational data signals from the vehicle;
a signal processor configured to modify one or more tone parameters responsive to the one or more vehicle operational data signals from the vehicle;
a Shepard tone generator configured to generate a Shepard tone responsive to the modified one or more tone parameters;
an audio post processor configured to render an audio post-processing parameter in response to the audio post processor's processing of the Shepard tone; and
a reproducer configured to reproduce the Shepard tone using one or more audio transducers;
where the one or more tone parameters are associated with a Shepard tone generator;
where the signal processor is further configured to modify the audio post-processing parameter when a vehicle operating condition is detected; and
where the modification of the one or more tone parameters occurs when the vehicle's velocity is substantially constant resulting in a low volume level of the reproduced Shepard tone.

* * * * *